United States Patent [19]
Kurebayashi et al.

[11] Patent Number: 5,124,620
[45] Date of Patent: Jun. 23, 1992

[54] CONTROL METHOD FOR ROBOTS

[75] Inventors: Toshiyuki Kurebayashi; Satoshi Kuranaga; Tatsuya Fukunaga; Osamu Hidaka, all of Kitakyushu, Japan

[73] Assignee: Kabushiki Kaisha Yaskawa Denki Seisakusho, Fujuoka, Japan

[21] Appl. No.: 571,546

[22] PCT Filed: Dec. 27, 1989

[86] PCT No.: PCT/JP89/01313
§ 371 Date: Aug. 21, 1990
§ 102(e) Date: Aug. 21, 1990

[87] PCT Pub. No.: WO90/07739
PCT Pub. Date: Jul. 12, 1990

[30] Foreign Application Priority Data

Dec. 29, 1988 [JP] Japan .................. 63-333396

[51] Int. Cl.[5] .............................. G06F 15/00
[52] U.S. Cl. ..................... 318/568.1; 318/568.13; 318/567; 364/191; 901/8; 901/3; 395/1
[58] Field of Search ..................... 318/560-646; 364/513, 200, 191, 192, 474.11; 901/3, 6, 7, 9, 12, 13, 15-23

[56] References Cited

U.S. PATENT DOCUMENTS

| 3,898,623 | 8/1975 | Cormier | 364/200 |
| 4,517,652 | 5/1985 | Bennett et al. | 364/513 |
| 4,907,150 | 3/1990 | Arroyo et al. | 364/200 |
| 4,922,418 | 5/1990 | Dolecek | 364/200 |
| 4,947,315 | 8/1990 | Sokolow et al. | 364/191 X |
| 4,998,050 | 3/1991 | Nishiyama et al. | 318/568.1 |
| 5,021,970 | 6/1991 | Mohri et al. | 364/513 |
| 5,032,975 | 7/1991 | Yamamoto et al. | 364/474.11 |
| 5,057,995 | 10/1991 | Mizumo et al. | 364/192 |

Primary Examiner—Paul Ip
Attorney, Agent, or Firm—Jordan and Hamburg

[57] ABSTRACT

When a welding teaching program employing a plurality of robots is completed, if a robot does not operate properly it may be preferably to make the robot retreat and operate in accordance with a different teaching program, urgently and at an optional timing. In the invention, when the operation of a program being executed is suspended, the program addresses are memorized and a different prestored teaching program is executed. Upon the termination of the different teaching program, the execution of the suspended program is resumed, referring to the memorized addresses.

2 Claims, 3 Drawing Sheets

CONTROL METHOD FOR ROBOTS

FIELD OF ART

The present invention relates to an execution method of a teaching program for a robot.

BACKGROUND OF THE INVENTION

A large number of execution methods of teaching programs for robots are called a sequential program method in which instructions are executed in the order of registration of instructions registered in a teaching program taught by an operator. During the execution of a teaching program, if a different teaching program is to be executed, a call instruction for calling the different teaching program will be registered in the teaching program and when the call instruction is executed the different program is executed.

In the prior art, when a different teaching program is to be executed during the execution of a teaching program, a call instruction has to be registered beforehand, and further instructions in the teaching program are executed in due order and when the call instruction is executed, the different teaching program is executed. Therefore, a different teaching program can be executed only in a position fixed in the execution of the teaching program, and a different teaching program is not capable of being executed in an optional position in the teaching program.

For example, when a robot is operated in a welding work operating a teaching program, it is impossible to make it retreat by urgently operating a different teaching program at an optional point.

Such necessity occurs when a plurality of robots are working in cooperation, one of the robots goes wrong, and the other robots are requested to stop operating.

The present invention of is directed to such circumstances and provides an execution method of a teaching program which can execute a different teaching program by the input of an interrupt input signal at an optional position during the execution of the teaching program.

SUMMARY OF THE INVENTION

To achieve the above-mentioned object, the control method of robots according to the present invention is constituted as shown in the following: in the execution of a teaching program for a robot, when the execution of a program being executed is interrupted by a signal input during the execution of a teaching program, the execution addresses of the program being executed are stored and a different program set beforehand is executed, and when the execution of the different program is terminated the execution of the interrupted teaching program is resumed referring to the stored addresses.

In the above-mentioned method, a plurality of different teaching programs can be selected by using different kinds of input signals.

DESCRIPTION OF THE PREFERRED EMBODIMENT

In the following, the present invention will be concretely explained based on an embodiment.

Figure 1:
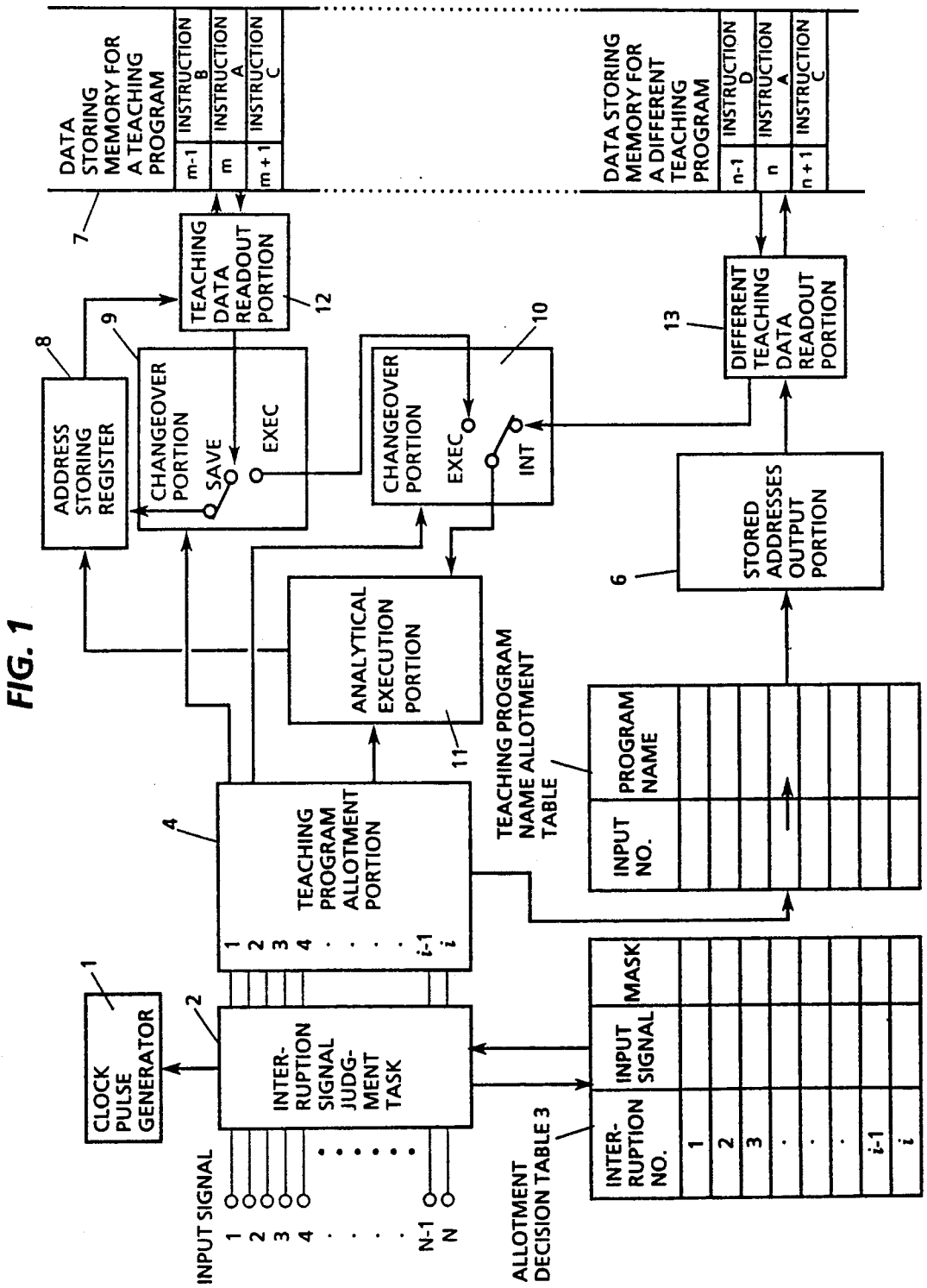
FIG. 1 is a block diagram showing the execution of an interrupt teaching program.

FIG. 1 is a block diagram showing an embodiment of the present invention. The present invention is constituted with software in fact, but in the present embodiment it is expressed as if it were constituted with hardware to facilitate understanding.

In FIG. 1, 1 is a clock pulse generator for starting an interrupt signal decision task 2 in a fixed cycle, 3 is an interrupt decision table for deciding an input signal to be allotted to the interruption of interrupt numbers 1 to i, 4 is a teaching program allotment portion for allotting a teaching program to each of the interruptions 1 to i decided by the interrupt signal decision task 2, 5 is a teaching program name allotment table in which teaching program names are allotted to interrupt numbers which are referred to by the teaching program allotment portion 4.

When a normal program is being executed, the instructions of teaching programs stored in a memory space of the teaching program data storing memory 7 are read out sequentially in the order of m−2, m−1, m, m+1 by a teaching data readout portion 12, and they are sent to a switching portion 9. In the switching portion 9, when there is no occurrence of interruption, as the switch is set at EXEC the data are sent to a switching portion 10. When there is no occurrence of interruption the switch in the switching portion 10 is also set at EXEC, so that the program is sent to an analytical execution portion 11. In the analytical execution portion 11, the instruction sent from the switching portion 10 is deciphered and executed.

The interrupt signal decision task 2 which is started in a fixed cycle by the clock pulse generator 1 constantly monitors input signals 1 to N. When an input signal is input, the interrupt signal decision task 2 checks if the input signal coincides with one of the input signals allotted to interrupt numbers of i pieces, 1 to i, referring to the allotment decision table 3 and also checks if the interrupt number is not invalid. If the input signal number is allotted to any one among i pieces of interrupt signals and it is also valid, the interrupt signal allotted to the input signal is sent to the teaching program allotment portion 4. In the teaching program allotment portion 4, a teaching program name which corresponds to the interrupt number sent from the interrupt signal decision task 2 is decided referring to the collation table in the teaching program name allotment table 5, and it is sent to a stored address output portion 6. Further the switching portions 9 and 10 are informed of the occurrence of interruption. In the switching portion 9, an internal switch is change over to SAVE; the address m of an instruction A in a teaching program being executed on the memory space in the teaching program data storing memory 7, in which a teaching program is stored, is stored in an address storing register 8. At this time, if the teaching program name corresponding to the interrupt number is not found, an alarm is given and a teaching program being executed is suspended, and a warning is given to an operator.

In the stored address output portion 6, a teaching program name sent from the teaching program name allotment table 5 is converted to the storing address of an instruction at the top of a teaching program of the teaching program name sent from the program name allotment table 5 on the memory space in the teaching program data storing memory 7, and it is sent to a different teaching data read out portion 13. In the different teaching data readout portion 13, an instruction A at the top of the interrupt program is read out from the memory space in the memory 7 designated by an storing address n sent from the storing address output portion 6, and it is sent to the switching portion 10. The switching portion 10 which has been informed of the occurrence of interruption from the teaching program allotment portion 4 sets the program switch at INT, so that the instruction A read out by the address storing register 8 is sent to the analytical execution portion 11. The analytical execution portion 11 deciphers the instruction and execute it. Following this, the different teaching data readout portion 13 sequentially reads out addresses in order of n, n+1, n+2, - - -, and they are sent to the analytical execution portion 11 through the switching portion 10, and they are deciphered and executed.

At the end of a teaching program, END instruction, which shows the end of the instruction, is registered, and the different teaching data readout portion 13 reads out the instruction and when it is executed in the analytical execution portion 11, the analytical execution portion 11 informs the switching portions 9 and 10 of the end of the instruction. The switching portion 9 reads out the address m, the address at the time of the occurrence of interruption, stored in the address storing register 8 and informs the teaching data readout portion 12 of the address. The teaching data readout portion 12 sends and instruction A in the address m, the address at the time of the occurrence of interruption, to the switching portion 9.

In the switching portion 9, the program switch is again change over to EXEC being informed of the termination of interruption from the analytical execution portion 11, so that the switching portion 9 sends the instruction A at the address m to the switching portion 10. IN the switching portion 10 too, the switch is again changed over to EXEC being informed of the termination of interruption from the analytical execution portion 11, so that the address data are read out form the address m, the address at the resumption after the suspension, in order of m+1, m+2, - - -, and they are sent to the analytical execution portion 11 through the switching portions 9 and 10; they are deciphered and executed therein and the teaching program is executed in the state as before the occurrence of interruption.

In FIG. 1, the portions, from the interrupt signal decision task 2 to the different teaching data readout portion 13, are explained as if they are constituted with hardware, but they can be realized with a program of software.

Figure 2:
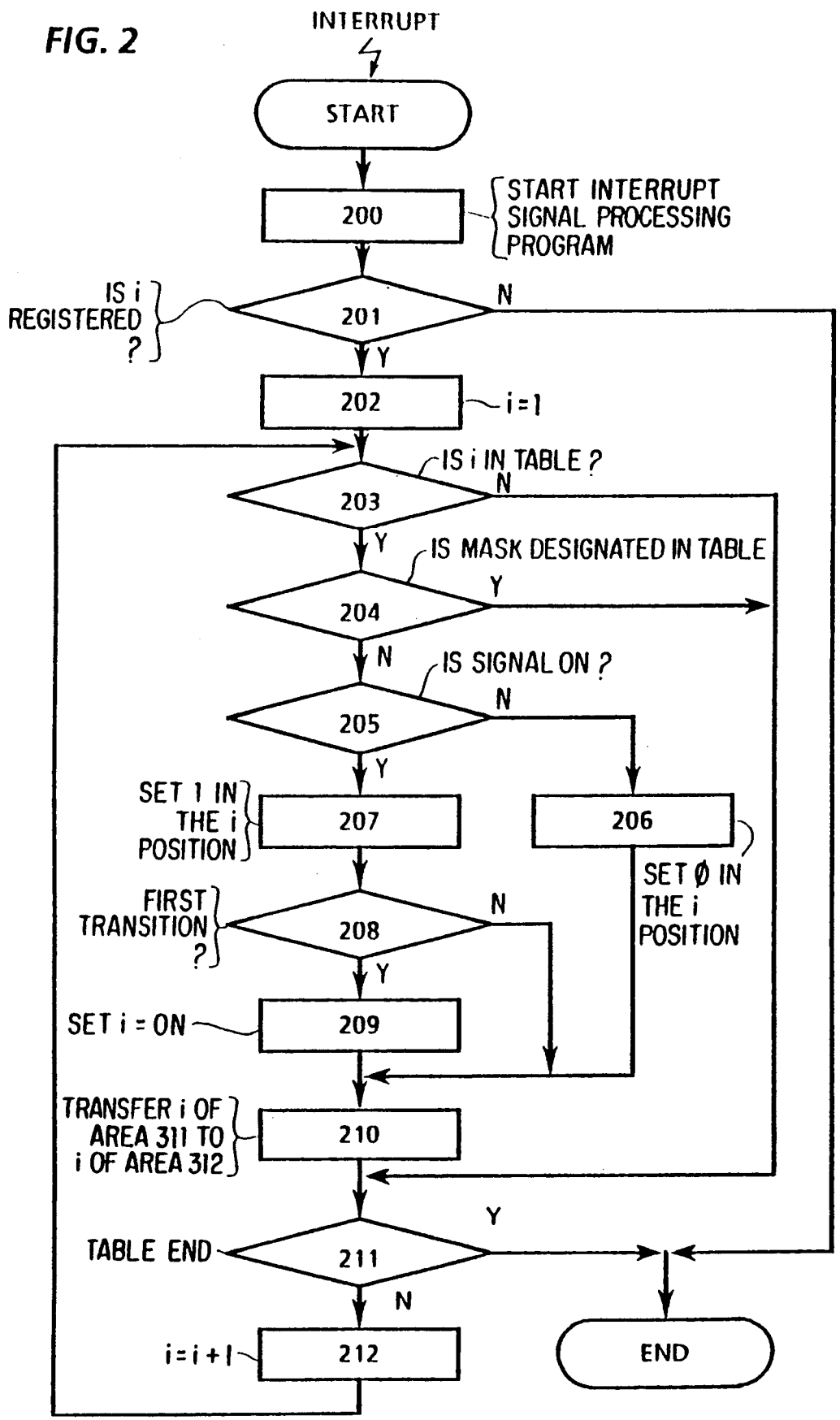
FIG. 2 is a flow chart showing an example of a deciding process program for an interrupt signal, which is a part of the process of an interrupt signal decision task shown in the execution block diagram of an interruption teaching program.
Figure 3:
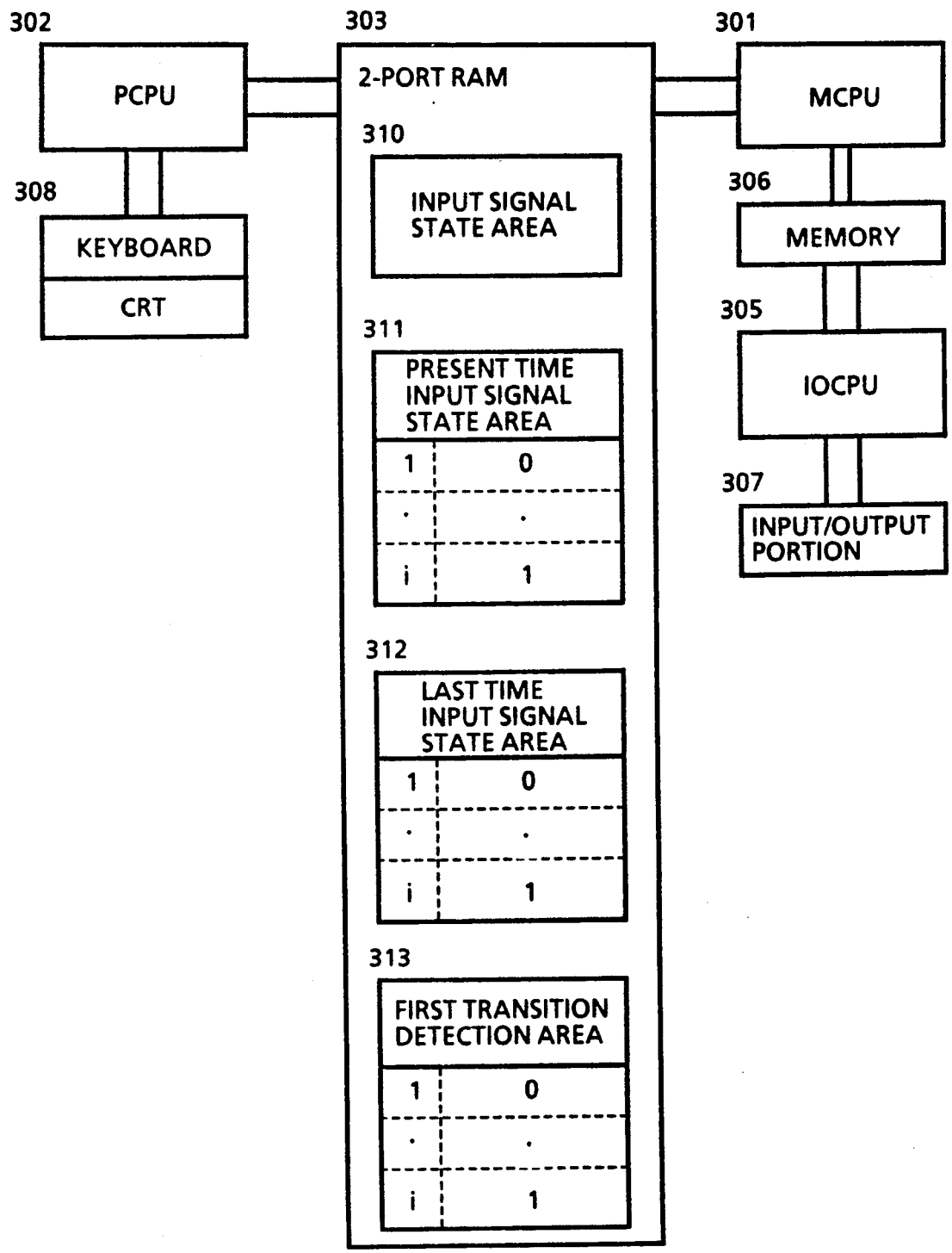
FIG. 3 is a block diagram showing an example of a hardware constitution in which the above-mentioned interrupt teaching program is operated.

For example, FIG. 2 is a flow chart when the interrupt signal decision task 2 shown in FIG. 1 is realized with a program of software. FIG. 3 shows the hardware for realizing software for the above-mentioned program. In FIG. 3, MCPU 301 is a central processing device which controls the actions of robots. PCPU 302 is a CPU which performs the interface between an operator and a robot control device; a keyboard and CRT are connected the PCPU 302. Two-port CMOS 303 is a memory to be read and written from both CPU's, MCPU 301 and PCPU 302. A portion 304 is a clock pulse generator which generates interruptions at a fixed cycle to the MCPU 301; 305 is an IOCPU for monitoring the state of input/output signals; 306 is a memory for storing the state of input/output signals, and with the start of the interrupt signal decision task in step 200 in the flow chart in FIG. 2, the state of input signals is transmitted to the input signal state area 310 of 2-port CMOS 303; 307 is an input/output portion.

When an interruption is generated to the MCPU 301 by the clock pulse generator 304, the interrupt signal decision task is started. The task called an interrupt signal decision task, but besides the processing program for an interrupt signal decision, a processing program for controlling robots is also operated. Therefore, when the interrupt signal decision task is started, immediately or after another control processing program for a robot which is not an interrupt signal decision processing is terminated, the interrupt signal decision processing program is operated. When an interrupt signal decision processing program is operated, the first transition of an input signal registered in the allotment decision table is decided in steps 201 to 207 shown in FIG. 2. In step 201, it is decided if the input signal number is registered in the allotment decision table by reading the data in the allotment table formed on the 2-port CMOS 303. If it is not registered, the interrupt signal decision processing program is terminated.

If it is registered, in step 202 an initial value 1 is set at an interrupt number counter i, and from the interrupt number No. 1 in the allotment decision table the first transition of the registered input signal is detected.

Next, in step 203, it is decided if the number of an input signal is registered in No. 1 in the allotment decision table by reading the input signal data in the allotment decision table formed on the 2-port CMOS 303. If it is not registered, step 211 is selected with a jump. If it is registered, step 204 is selected.

In step 204, it is decided if a mask is designated in No. i in the allotment decision table by reading the mask data in the allotment decision table formed on the 2-port CMOS 303. If the mask is designated, step 211 is selected with a jump. If the mask is not designated, step 205 is selected.

In step 205, it is decided if the input signal having the number of the registered input signal is in an ON state by reading the input signal state area 310 to which the state of an input signal is transferred in step 200. If the input signal is not in an ON state, step 206 is selected.

In step 206, "0" is set in the No. i position in the present time input signal state area 311 on the 2-port CMOS, and then step 210 is selected with a jump. If the input signal is in a ON state, step 207 is selected.

In step 207, "1" is set in the No. i position in the present time input signal state area 311 on the 2-port CMOS, and step 208 is selected.

In step 208, the signal state in No. i position in the last time input signal state area 312 on the 2-port CMOS 303 is read and the state is decided if it is a first transition of an input signal. In this time, the state is in an ON state, so that if the last time input state is not in an ON state, the state is decided to indicate the first transition of an input signal. About the last time input signal state area 312 will be explained later. If the state is decided not to be indicating a first transition of an input signal, step 210 is selected. If a first transition of an input signal is detected, step 209 is selected.

In step 209, an ON state is set in No. i position of an first transition detection area 313 on the 2-port CMOS, and step 210 is selected.

In step 210, the data in No. i position of the present time input signal state area 311 on the 2-port CMOS 303 are transferred to No. i position of the last time input signal state area 312 on the 2-port CMOS 303, and then step 211 is selected.

In step 211, it is decided if the interrupt decision table is reached an end. For example, if the end of the interrupt decision table is interruption No. 8, the table reaches to an end at i=8 and an interrupt signal decided process program is terminated. If the interrupt decision table is not terminated in step 211, step 212 is selected.

In step 212, 1 is added to the interrupt number counter i to come back to step 203, and the first transition of an input signal registered in the interrupt number counter i+1 is decided. Following this, the operation is repeated until the interrupt decision table is terminated.

As described in the above, in detecting the interrupt number registered in the interrupt decision table which corresponds to an input signal which has been built up from an off state, and the number is transferred to the teaching program allotment portion as an interrupt number in which an interruption is generated.

As mentioned in the above, in the present invention, during the execution of a teaching program, a different teaching program can be executed at an optional point with an interrupt signal, and after the execution of the different teaching program is terminated, the execution of the original teaching program is resumed from the address at which the execution is suspended.

Owing to this, during the operation of robots, retreating actions etc. can be performed urgently calling another job at an optional timing, and after the termination of these actions the original operation can be resumed. This is especially effective for the management of troubles.

The present invention can be utilized for the management of problems of industrial robots when they are included in a system.

We claim:

1. A method for controlling a plurality of robots in an operation of a teaching program, comprising the steps of:
   controlling a robot using a given teaching program having a sequence of program steps stored at a plurality of addresses;
   storing a different teaching program in a first memory;
   suspending of the operation of said teaching program in response to a signal input during the execution of the teaching program;
   storing a first address of a program step of the teaching program at the time of receipt of said signal, in a second memory;
   controlling said robot in accordance with said different teaching program in response to said signal; and
   resuming the controlling of said robot with said teaching program, starting with the program step at said stored first address, upon the termination of said different program.

2. The method for controlling robots according to claim 1 comprising storing a plurality of additional different teaching programs, and selecting predetermined ones of said plurality of said additional different teaching programs by different kinds of input signals:
   suspending the operation of said teaching program in response to said different kinds of signals input during the execution of the teaching program;
   storing a second address of a second program step of the teaching program at the time of receipt of said different kinds of input signals;
   selectively controlling said robot in accordance with the selected one of said different teaching programs in response to said different kinds of input signals; and
   resuming the controlling of said robot with said teaching program, starting with the second program step at said stored second address, upon the termination of said further different program.

* * * * *